United States Patent [19]

Tompkins et al.

[11] 4,270,131
[45] May 26, 1981

[54] ADAPTIVE ERROR CORRECTION DEVICE FOR A LASER SCANNER

[76] Inventors: E. Neal Tompkins, 12847 Castle Bend, San Antonio, Tex. 78230; Henry M. Donzis, 4918 Brandeis, San Antonio, Tex. 78249

[21] Appl. No.: 96,624

[22] Filed: Nov. 23, 1979

[51] Int. Cl.³ ............................................. G01D 15/14
[52] U.S. Cl. ..................................... 346/108; 350/6.8; 358/285; 358/302
[58] Field of Search ............... 346/108, 76 L; 358/285, 358/293, 292, 302; 350/6.8, 6.7, 6.6; 250/237 R

[56] References Cited

U.S. PATENT DOCUMENTS

| | | | |
|---|---|---|---|
| 3,646,568 | 2/1972 | Woywood | 346/108 |
| 3,787,887 | 1/1974 | Burton | 346/108 |
| 3,809,806 | 5/1974 | Walker | 346/108 X |
| 3,811,009 | 5/1974 | Fukumoto | 358/302 |
| 3,835,249 | 9/1974 | Dattilo | 358/285 |
| 3,999,010 | 12/1976 | Oosaka | 358/285 X |
| 4,059,833 | 11/1977 | Kitamura | 346/108 |
| 4,143,403 | 3/1979 | Ohnishi | 358/285 X |
| 4,144,539 | 3/1979 | Davie | 346/108 X |
| 4,180,822 | 12/1979 | Hudson | 346/108 |
| 4,214,157 | 7/1980 | Check | 358/302 X |

OTHER PUBLICATIONS

Helmberger et al; Correction of Axial Deflection Errors in Rotating Mirror Systems; Optics & Laser Technology, Dec. 1975.

*Primary Examiner*—Joseph W. Hartary
*Attorney, Agent, or Firm*—Gunn, Lee & Jackson

[57] ABSTRACT

An adaptive system is shown for electronically correcting for errors in a laser scanner. A start-of-scan signal is provided by a photodetector having a special mask with a window over the front of the photodetector. The start-of-scan signal from the photodetector eliminates the facet-to-facet errors. The special mask gives a stepped amplitude signal output from the photodetector with the maximum amplitude of the signal providing amplitude modulation to correct the intensity of the laser beam, and the lower amplitude of the stepped amplitude signal providing frequency modulation to correct the facet-to-axis error. By the use of the delays, counters, and memory, the intensity and facet-to-axis errors are continuously being corrected with each revolution of the spinner.

12 Claims, 5 Drawing Figures

ADAPTIVE ERROR CORRECTION DEVICE FOR A LASER SCANNER

BACKGROUND OF THE INVENTION

The present invention relates to laser scanners and, more particularly, to an electrical system for continually correcting facet-to-axis errors, facet-to-facet errors, and intensity of the light beam. These corrections are provided dynamically by use of a specially designed photodetector to give a particular waveform output that is used in conjunction with a dynamic memory to provide the various adjustments.

BRIEF DESCRIPTION OF THE PRIOR ART

Prior to the present invention, laser scanners have continuously experienced a problem in controlling the laser beam. In previous laser scanners, spinners with multiple facets were used to project the laser beam onto a photoconductive drum. Because of the accuracy necessary for some of the mirrors, they would cost several thousand dollars and greatly increase the price of a laser line printer or scanner. Cheaper spinners were available, but created problems of facet-to-axis errors due to very minor variations in the angle of the reflecting surface. Because of the expense connected with manufacturing an accurate spinner, it is important to be able to use a more economical, less accurate spinner, yet provide other means for correction of the facet-to-axis errors.

Also because of variations in the reflective nature of each of the surfaces of the spinner, facet-to-facet errors would occur between each line whereby each line would not be started along the same vertical line of the paper. Further, other errors would creep into the system due to variables, such as temperature changes that occur during operation of the laser scanner. These errors, due to a presetting of the laser scanner, would not be corrected, but in the present invention they would be corrected dynamically.

Further, while many different devices have been utilized for correcting variations in the intensity of the laser beam, a dynamic type of adjustment is necessary. A manual adjustment that may be correct initially may not give the correct intensity after a laser scanner has operated for a period of time.

Much of the prior art that has been developed for laser devices has been in the photocopying area, and not for laser scanners that would handle word processing type of equipment. However, since there is some relationship between photocopying using a laser beam, and a laser scanner for data processing, some of this voluminous field of prior art will be discussed in the subsequent paragraphs of this section. One of the better references known by applicants is an article entitled "Correction Of Axial Deflection Errors In Rotating Mirror Systems" by Helmberger, et al. that appeared in *Optics & Laser Technology*, December 1975. In this article, facet-to-axis errors were corrected manually for each phase of a polygon mirror with multiple facets. The correction for each facet was manually adjusted into the system. Likewise, the intensity was manually adjusted for each mirror facet and set into the system. However, there was not provided any type of dynamic adjustment for variable factors, such as temperature, humidity, machine tolerances, just to name a few, which would change with time.

Various patents issued by the United States Patent and Trademark Office show start-of-scan photodetectors to correct facet-to-facet errors by providing a start-of-scan signal. A typical such patent is U.S. Pat. No. 4,059,833 issued to Kitamura, et al. Other typical patents having start-of-scan detectors include Woywood (U.S. Pat. No. 3,646,568), Dattilo, et al. (U.S. Pat. No. 3,835,249), Oosaka, et al. (U.S. Pat. No. 3,999,010), and Ohnishi (U.S. Pat. No. 4,143,403). Some of the patents, such as Woywood, utilize beam splitters or multiple spinners to provide for correction in the facet-to-facet errors with a start-of-scan signal. Other systems use a motor type of control that has a very slow response time.

Many different types of systems have been devised to dynamically control the intensity of the laser beam, such as shown in Davie, et al. (U.S. Pat. No. 4,144,539), which utilizes a beam splitter with a portion of the beam being used to control the acoustooptic modulator. However, Davie does not provide any type of memory circuit that can give a dynamic correction for each individual facet of the mirror. For multiple facet mirrors as are used in laser line printers, a separate correction is necessary for each facet to enable the manufacturer to use a more economical spinner. Other types of systems to control intensity of a laser beam can be found in Burton (U.S. Pat. No. 3,787,887), Fukumoto, et al. (U.S. Pat. No. 3,811,009), or previously mentioned patent to Dattilo, et al.

Providing both facet-to-facet correction with a start of scan signal and facet-to-axis correction is Walker, et al. (U.S. Pat. No. 3,809,806). A V-shaped window is provided for a photodetector which will adjust the line of scan either up or down depending upon the width of the particular pulse output from the photodetector. However, no type of dynamic memory is shown for continual updating to adjust the scan line either up or down.

While these are only some of the patents found in a voluminous field of prior art, none of the patents known by applicants show the invention as described and claimed hereinafter.

SUMMARY OF THE INVENTION

It is an object of the present invention to provide a nonimpact laser scanner with dynamic correction for errors.

It is another object of the present invention to provide dynamic correction in a laser scanner for facet-to-facet errors, facet-to-axis errors, and intensity of the laser beam.

A photodetector with a special mask having an L-shaped window therein is placed close to the photoconductive drum so that each line of scan from the laser beam will first strike the photodetector through the L-shaped window prior to sweeping across the photosensitive drum. If the photodetector and mask are properly positioned, a signal output will be generated in the form of a stepped voltage function. On the leading edge of the signal output from the photodetector, a start-of-scan signal is provided once the output voltage of the photodetector exceeds a predetermined voltage level. The first portion of the signal output will be of a higher voltage magnitude and may be used to control the intensity of the laser beam as will be explained in more detail subsequently. Thereafter, the signal output steps down to approximately half of the preceding voltage. Depending upon the magnitude of the second and lower voltage level, the sweep for that individual facet of a spinner mirror is adjusted either up or down to correct for facet-to-axis errors.

The output from the photodetector feeds through an amplifier into a series of three comparators. The first comparator gives the start-of-scan signal once the output voltage of the photodetector exceeds a first predetermined voltage level. The output of the first comparator also initiates time delays to start the operation of the entire correction circuitry. After a first time delay, a second comparator compares the magnitude of the output signal from the photodetector with a second predetermined voltage level to give an intensity correction signal output. Likewise, after a second time delay, the output from the third comparator will give an output signal dependent upon whether or not the second voltage level exceeds a third predetermined voltage level to give a facet-to-axis correction signal.

A mirror counter is provided that is clocked by the start-of-scan signal with the output of the mirror counter controlling two random access memories for both intensity correction and facet-to-axis correction. Located between the output of the second comparator and the random access memory for intensity correction is a 0–255 bit counter which is initially positioned near the center count thereof. Dependent upon the intensity correction signal, the counter either counts up or down one bit with the output feeding through a digital-to-analog (D/A) converter to adjust the amplitude modulation of the acoustooptic modulator of the laser beam. The output of the counter is in turn stored into the random access memory until that same facet of the spinner again sweeps across the photosensitive drum.

Likewise between the third comparator and the random access memory for controlling facet-to-axis errors, is located another 0–255 bit counter. While the counter is initially positioned near the center count thereof, dependent upon the facet-to-axis correction signal from the third comparator, the counter will count either up or down one bit. The output from the counter, which is stored in memory also feeds through a D/A converter and voltage controlled oscillator to control the frequency modulation of the acoustooptic modulator and thereby correct the position of the line of scan of the laser beam.

The acoustooptic modulator that may be used in the present invention typically has a band width of approximately 40 MHz. Therefore, the output of either of the counters should adjust the acoustooptic modulator over its entire band width with the 40 MHz adjustment being typical. In the present invention, it is envisioned that the laser beam may be positioned up or down over the full range of 0–255 bit output from the counter, which in turn provides the full range of correction for the acoustooptic modulator for facet-to-axis errors. Likewise, a full range of correction for the acoustooptic modulator is provided to correct the intensity of the laser beam over the full range of the band width of the acoustooptic modulator.

The corrections are provided for each facet of the spinner mirror and stored in the random access memories until the same mirror again reflects the laser beam across the photosensitive drum. After a few revolutions of the spinner, the random access memories have stabilized with the correct amplitude modulation being provided to correct the intensity, and the correct frequency modulation being provided to correct the facet-to-axis errors. Thereafter, if the parameters change due to temperature changes, variations in tolerances of shaft bearings, strain by centrifugal forces, etc., the laser beam will automatically be adjusted to compensate for those changes.

The correction techniques envisioned by the present invention will eliminate the commonly called facet-to-facet errors by the output from the first comparator which provides a start-of-scan, the facet-to-axis errors which are corrected by frequency modulation controlled by the output of the third comparator, and by beam intensity correction as provided by the output of the second comparator. These corrections are continuous.

DESCRIPTION OF THE PREFERRED EMBODIMENT

Figure 1:
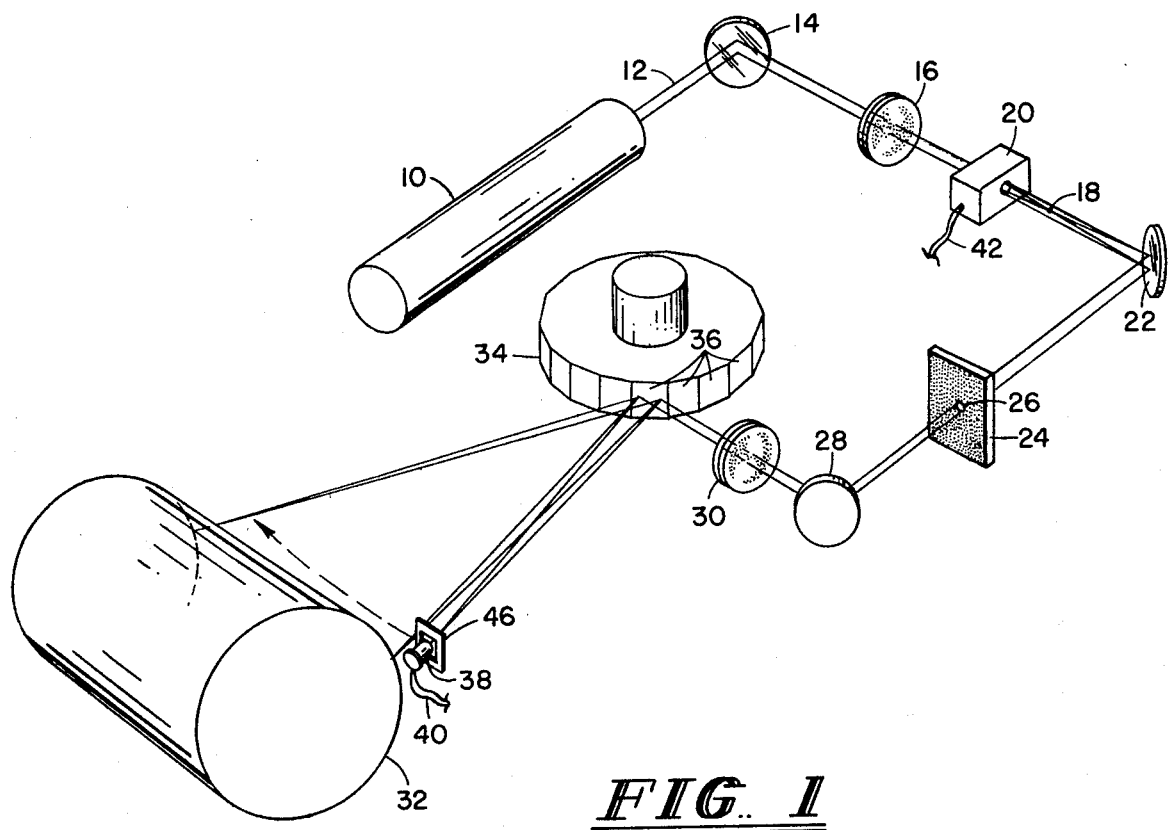
FIG. 1 is an illustrative perspective view of an optics bench for a laser line printer or scanner.

Referring to FIG. 1 there is pictorially illustrated an optics bench for a laser scanner utilizing the present invention. A laser 10 generates a light beam 12 of coherent light in the conventional manner. Any particular type of laser 10 may be used; however, it is presently envisioned that the more economical lasers would be utilized for the present invention. The laser beam, due to the layout of the optics bench, is turned by reflecting mirror 14 and focused by lens 16 to a focal point 18. However, just prior to the focal point 18 is located an acoustooptic modulator 20 to vary either the amplitude or the phase of the laser beam 12. The acoustooptic modulators are also known as "Bragg cells". The acoustooptic modulator must be located immediately prior to the focal point 18 so that the acoustooptic modulator 20 will properly deflect the laser beam 12. There will be motion of the deflected laser beam 12 or spot at the focal point that now corresponds with the image plane of the drum. The position of the acoustoptic modulator 20 is selected to optomize the rise time of the modulator and the amount of light deflection at the drum versus frequency change of the modulator.

Mirror 22 again folds the laser beam 12 to make the optics bench a compact package. Next a stop 24 is located in the path of the laser beam 12 with a hole 26 near the center thereof. The hole 26 is positioned so that as the acoustooptic modulator 20 modulates the coherent light from the laser 10, only the deflected portion of the light passes through hole 20.

Next another mirror 28 again folds the laser beam 12 and directs the laser beam through lens 30 which focuses the laser beam 12 so that the focal point now corresponds approximately with the surface of photosensitive drum 32. However, between the focusing lens 30 and the photosensitive drum 32 is located spinner 34 that has numerous mirror facets 36 thereon with eighteen being a typical number. As the spinner 34 turns, each mirror facet 36 causes the laser beam to sweep across the photosensitive drum 32 as indicated by the direction of the arrow. The focal point of the laser beam 12 now corresponds with the surface of the photosensitive drum 32.

Figure 2:
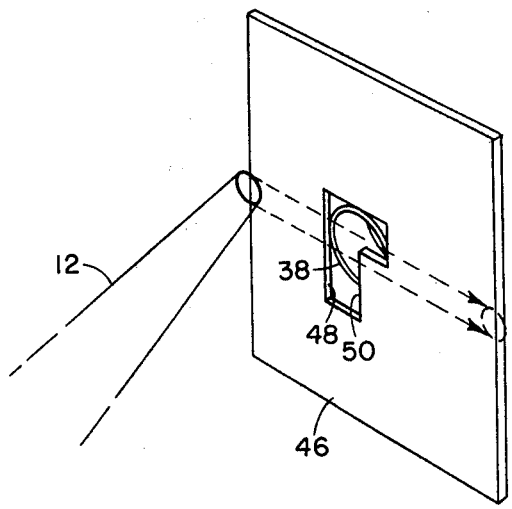
FIG. 2 is an enlarged illustrative perspective view of the photodetector and mask shown in FIG. 1.

Located immediately adjacent to the photosensitive drum 32 is a photodetector 38 so that as the laser beam 12 sweeps across the photosensitive drum 32, it first sweeps across the photodetector 38. The photodetector 38 through electrical leads 40 controls the acoustooptic modulator 20 through input 42 in a manner as will be subsequently explained in more detail. The photodetector 38 has a mask 46 over the front thereof as shown in more detail in FIG. 2. The mask is so positioned so that as the laser beam 12 sweeps across the mask 46, upon reaching elongated vertical opening 48, the full effect of the laser beam is immediately sensed by the photodetector 38 to give a sharp rise time voltage output. As the laser beam 12 continues to sweep across the photodetector 38, it strikes the quarter mask 50 which is located near the horizontal axis of the photodetector 38. The quarter mask being positioned near the horizontal axis of the photodetector 38 reduces the magnitude of the output voltage from the photodetector 38 to approximately one-half of its earlier output voltage. The actual magnitude of the output voltage is proportional to the position of the spot in the vertical dimension.

Figure 3:
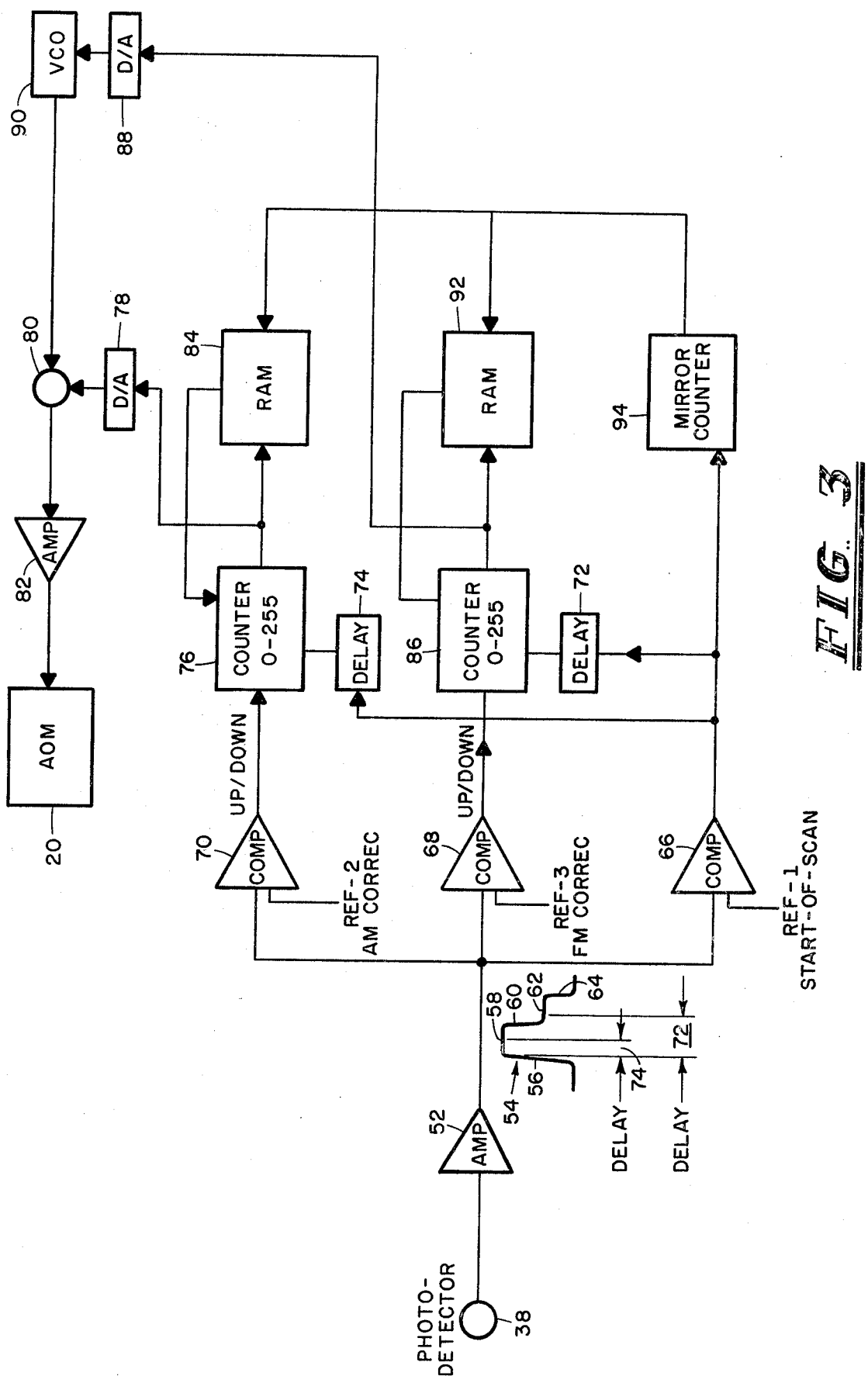
FIG. 3 is a generalized block diagram of the correction circuitry for the present invention.

Referring to FIG. 3 and the generalized block diagram, the function of the photodetector 38 along with the remaining portions of the correction circuit for the laser line printer is explained in more detail. The output from photodetector 38 feeds through amplifier 52 to give a waveform output 54 as pictorially illustrated adjacent thereto. The sharp rise 56 of waveform output 54 corresponds to the point in time when the laser beam 12 sweeps past the leading edge of the elongated vertical opening 48. Thereafter once the laser beam 12 is fully striking the photodetector 38 (see FIG. 2), the output of the photodetector 38 gives a peak output voltage 58. Thereafter as the laser beam strikes the quarter mask 50 (see FIG. 2) there is a first sharp decline 60 in the output waveform 54. The voltage levels off to give a step-down output voltage 62 that should be approximately one-half of the peak output voltage 58. As the laser beam 12 moves past the opening for the mask 46, the waveform output 54 has a second sharp decline 64 to approximately zero.

From the amplifier 52 the waveform output 54 is then fed to comparators 66, 68 and 70. Feeding into comparator 66 is also reference voltage 1 so that during the sharp rise 56 of waveform output 54, upon exceeding reference voltage 1 comparator 66 gives an output which is a start-of-scan signal. Simultaneously the start-of-scan signal from comparator 66 initiates the beginning of delays 72 and 74. At the end of delay 74, the output waveform output 54 from amplifier 52 should be at its peak output voltage 58. Also feeding into comparator 70 is reference voltage 2 along with the output waveform 54. If at the end of the delay 74, the peak output voltage 58 exceeds reference voltage 2, counter 76 will count up. However, if the opposite is true counter 76 will count down. Counter 76 is a 0–255 bit counter that will not accept a trigger input until the expiration of delay 74. The output signal from the comparator 70 provides the amplitude modulation correction for the acoustooptic modulator 20 by feeding the output from counter 76 through digital-to-analog converter 78, mixer 80, and RF amplifier 82. Also the output from counter 76 feeds into random access memory 84 for storage until the next cycle.

After delay 72 has expired, the output waveform 54 of amplifier 52 should be at the step-down output voltage 62. By feeding reference voltage 3 into comparator 68, either a step-up or step-down output signal is provided into counter 86. Counter 86 which is a 0–255 bit counter either steps up or down depending upon whether or not the reference voltage 3 has been exceeded by the step-down output voltage 64. The stepping up or stepping down of counter 86 provides frequency modulation correction for the acoustooptic modulator 20 via digital-to-analog converter 88, voltage control oscillator 90 which agains feeds through mixer 80, RF amplifier 82 to control the acoustooptic modulator 20. Again the output from counter 86 is fed into random access memory 92 for storage.

The start-of-scan signal from comparator 66 also initiates mirror counter 94 which counts the number of mirrors on the spinner 34. Depending upon which mirror facet 36 is currently reflecting the laser beam 12 across the photodetector 38, the mirror counter 94 will provide an appropriate address code to random access memories 84 and 92. In turn random access memories 84 and 92 will put the proper count into counters 76 and 86, respectively, that had previously occurred at the time the same mirror facet previously reflected across photodetector 38. Therefore, each time a signal is received either from comparators 70 or 68, the counters 76 or 86, respectively, will count either up or down one count.

The amplitude modulation correction provided by reference voltage 2 via comparator 70 adjusts the intensity of the laser beam by controlling the amplitude modulation of the signal provided through the acoustooptic modulator 20.

The frequency modulation correction provided by reference voltage 3 through comparator 68 adjusts the position of the laser beam 12 up or down on the photosensitive drum 32 by frequency modulation of the acoustooptic modulator 20.

The above described cycles are repeated for each facet 36 of the spinner 34. After a few revolutions of the spinner 34 (a matter of less than a second), the random access memories 84 and 92 are basically stabilized to insure the correct amplitude modulation correction and frequency modulation correction for the acoustooptic modulator 20. Thereafter, if the parameters change due to temperature changes, tolerances in shaft bearing, strain of centrifugal forces, etc., the previously described system shown in FIG. 3 will automatically adjust the position of the laser beam 12 on the photosensitive drum 32, as well as changing the intensity. By use of such automatic compensation, a much less expensive spinner 34 may be used with an even better end result than the more expensively machined spinners.

The start-of-scan signal provided by comparator 66 eliminates facet-to-facet errors. The correction provided by comparator 70 for amplitude modulation corrects the intensity of the laser beam 12. The correction provided by comparator 68 for frequency modulation eliminates facet-to-axis errors caused by improper vertical positioning of the laser beam 12.

The acoustooptic modulator 20 has a center frequency of approximately 80 MHz. In the adjustment of the acoustooptic modulator 20 as just described, it may be adjusted over a band width of approximately 40 MHz or ±20 MHz about the center frequency of 80 MHz. Therefore, each count of the 0–255 bit counters 76 and 86 must adjust each proportionate share of the 40

MHz band width. This is important so that the acoustooptic modulator 20 may be controlled over its entire range of correction or band width of 40 MHz.

Figure 4:
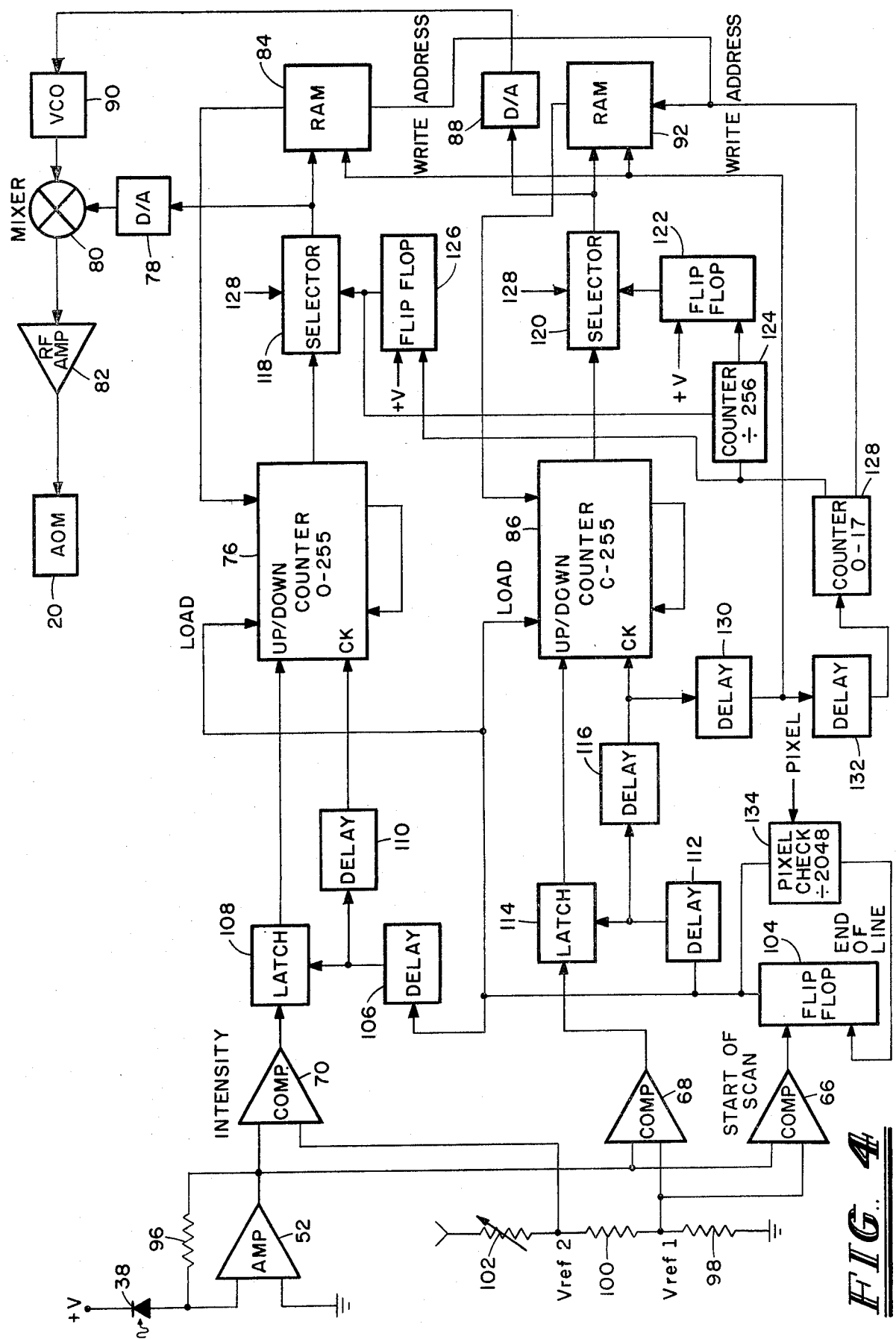
FIG. 4 is a more detailed block diagram for the correction circuitry for the present invention.

Referring now to FIG. 4, a more detailed functional diagram of the correction circuitry is given. Like numbers that have previously been used will again be used in FIG. 4 where appropriate. The photodetector 38 is supplied with a voltage of +V with the output of the photodetector 38 feeding into differential amplifier 52. The setting for the amplifier 52 is controlled by resistor 96. The output of the differential amplifier 52, which is essentially waveform 54 previously discussed in connection with FIG. 3, feeds into comparators 66, 68 and 70 which controls the start-of-scan, intensity correction, and facet-to-axis compensation, respectively. Because the comparators 66, 68 and 70 are differential comparators, they must have a reference voltage input. The reference voltage is provided by resistance divider network composed of resistors 98, 100 and variable resistor 102. Voltage reference 2 provides the same reference voltage 2 as previously described in conjunction with FIG. 3. Voltage reference 1 provides the start-of-scan signal through comparator 66, but is also used in the facet-to-axis compensation of comparator 68 in place of reference voltage 3. In other words, reference voltage 3 as discussed in conjunction with FIG. 3 can be identical to the voltage level required for the start-of-scan signal.

Once voltage reference 1 has been exceeded, comparator 66 gives an output signal that sets flip flop 104. The setting of flip flop 104 initiates delay 106 that controls the output of comparator 70. After the delay 106 has expired, the output of comparator 70 is fed into latch 108 for subsequent feeding into counter 76. A further delay 110 is necessary to simply allow setup time for the counter 76. At the end of the time set in by delay 110, the counter 76 either counts up or down one count. If the reference voltage 2 fed into comparator 70 exceeds the voltage waveform 54, then the counter 76 will count up. If just the opposite is true, the counter 76 will count down.

Figure 5:
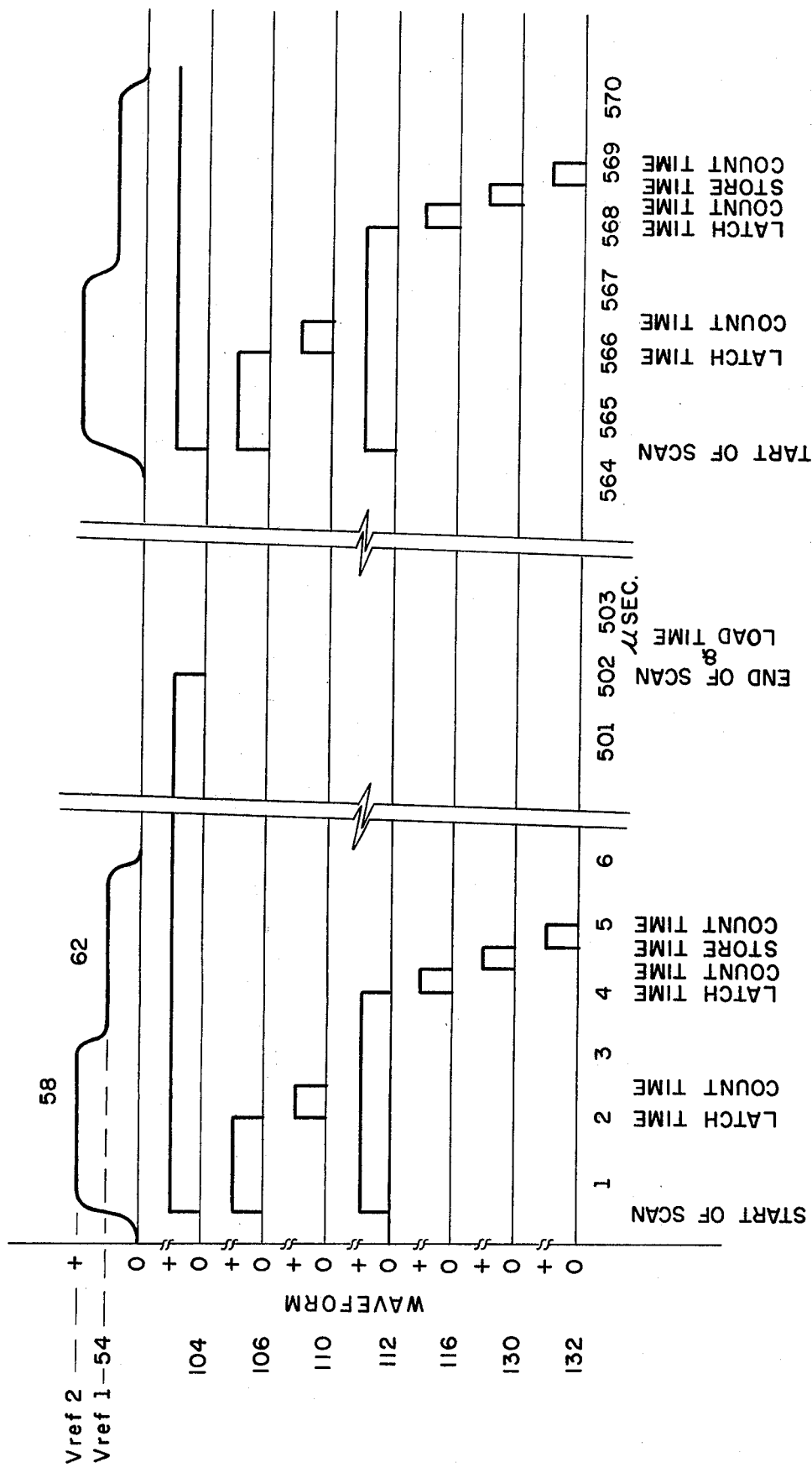
FIG. 5 is a timing diagram for FIG. 4.

To better explain the sequence of events, a timing diagram is included herewith as FIG. 5. Like numbers used to designate the components parts in FIG. 4 will be used to indicate the waveform of FIG. 5. As can be seen in the waveforms 104, 106 and 110 of FIG. 5, all of the clocking for counter 76 takes place during the peak output voltage 58 of waveform 54.

Further, the output of flip flop 104 actuates delay 112 that controls latch 114. Once the delay 112 has expired, latch 114 will hold the output received from comparator 68. Again, to allow setup time for the counter 88, a further small delay 116 is provided prior to feeding the signal into counter 86. Again, depending on whether or not the step down output voltage 62 exceeds voltage reference 1, the counter 86 will count up or down one count. Again, the timing functions are shown in the waveform diagram of FIG. 5.

Now that both counters 76 and 86 have completed their count, their information should be stored into random access memories 84 and 92, respectively. The information from counter 76 feeds through selector 118 to random access memory 84. The purpose of selector 118 is at the time of power up to the system, the number of 128 will first be fed into random access memory 84 so that each of the facets 36 will have a known value loaded into the random access memory 84 at the time of the first count. The same is true for counter 86 that feeds through selector 120 prior to feeding into random access memory 92.

It is also very important that the intensity adjustment stabilizes prior to engaging the facet-to-axis compensation. Since there are only a total of 256 counts over which the acoustooptic modulator 20 can be adjusted in intensity, facet-to-axis correction signals should not be fed into the random access memory 92 until after 256 cycles. Therefore, flip flop 122 is controlled by counter 124 that counts 256 cycles so that after 256 cycles, flip flop 122 allows the correction of the random access memory 92 to occur through selector 120. Likewise, flip flop 126 prevents correction to random access memory 84 via selector 118 until after one cycle after power up.

The input for counter 124 is controlled by 0-17 bit counter 128 that counts the facets 36 on the spinner 34. This tells the random access memories 84 or 92 which mirror facet is currently reflecting across the photodetector 38. Each time the counter 128 counts from 0-17 bits, it will give an output to address the memories of random access memories 84 and 92. It will also given an output to reset flip flop 126 and to increment counter 124 once each cycle. Going back to the input for counter 128, after delay 112 for the frequency modulation correction and delay 116 for the setup time, an output signal out of delay 116 controls delay 130 which simply allows time for counter 86 to complete its count. After delay 130, the outputs of counters 76 and 86 are written into random access memories 84 and 92. Since a full cycle of correction is now complete, a further delay 132 which is simply long enough to allow random access memories 84 and 92 to complete their storage of information, a signal is fed into counter 128 to indicate the count for that particular facet is complete and it is time to move on to the next facet.

At the end of the line, there is a counter 134 that counts the number of clock pulses provided by pixel bits to indicate when the line of scan is complete. The typical number of pixel bits is presently anticipated to be 2048. After the line of scan is complete, an output from counter 134 resets start-of-scan flip flop 104. The timing as further provided by start-of-scan flip flop 104 and sequencing delays 130 and 132 can be seen in the waveform diagrams of FIG. 5.

The resetting of flip flop 104 loads the counters 76 and 86 from random access memories 84 and 92, respectively, to what the correction value should be for that particular facet, which is about to reflect the laser beam across the photodetector 38. It should be realized that all of the timing functions as shown in FIG. 5 are after counter 124 is counted through 256 revolutions of the spinner 34 immediately after power up. Thereafter, once all of the memories are complete and the correction factors included, 2048 bits of information will be fed to the photoelectric drum 32 via the laser beam 12 per sweep. In FIG. 5 of the timing diagram, only the timing functions at each end of the line of sweep are shown.

The output for counter 76, which feeds through selector 118, is subsequently fed to digital analog converter 76 into the mixer 80 for subsequent control of the acoutooptic modulator 20 by the RF amplifier 82. The output from counter 76 controls the amplitude of the signal received by the acoustooptic modulator and consequently, the intensity of the laser beam striking the photoelectric drum 32.

Likewise the output of counter 86 feeds through selector 120 and digital analog converter 88 into voltage control oscillator 90. The output from voltage control oscillator 90 feeds through mixer 80 into the acoustooptic modulator 20 via RF amplifier 82 to control the frequency modulation of the laser beam 12 and hence to correct for facet-to-axis errors. After the first 256 revolutions, selectors 118 and 120 no longer have an effect on the system until power is turned OFF and turned ON again.

In summary, as the laser beam 12 sweeps across the photodetector 38, an output signal feeds through differential amplifier 52 into comparators 66, 68 and 70. Upon exceeding reference voltage 1, comparator 66 gives a start-of-scan signal that triggers flip flop 44 and initiates delays 106 and 112. After delay 106, the peak output voltage 58 should be received from the photodetector 38. If the peak output voltage 58 exceeds reference voltage 2, counter 76 via latch 108 will count up or if the opposite is true, count down. The output from the counter 76 is stored in random access memory 84 until that particular facet again reflects across photodetector 38. The output from counter 76 feeds through digital analog converter 78, mixer 80, RF amplifier 82, to control the amplitude modulation of acoustooptic modulator 20, and hence the intensity of the laser beam. This correction feature is dynamic and continual.

After the expiration of delay 112, the output from comparator 68 feeds through latch 114 into counter 86. The count already in counter 86 has been fed into the counter 86 by random access memory 92. After counting up or down one count by counter 86, depending upon whether or not the voltage reference 1 has been exceeded, the output is fed into random access memory 92 and through digital to analog converter 88, voltage control oscillator 90, into mixer 80. From mixer 80 through RF amplifier 82, the frequency of the acoustooptic modulator 20 is controlled which adjusts the laser beam up or down to correct for facet-to-axis errors. Again, this correction feature is dynamic and continual.

By use of the start-of-scan signal as provided by comparator 66, all of the facets at the beginning of each line of scan are located along a vertical line thereby eliminating facet-to-facet errors. By use of the total system as just described, a dynamic adjustment is provided that compensates for normal operational variables to correction for (1) facet-to-facet errors, (2) facet-to-axis errors, and (3) intensity in a laser scanner.

We claim:

1. A dynamic error correction device for a laser scanner having at least a laser for generating a laser beam, a multiple facet spinner, and an acoustooptic modulator, comprising:
   photodetector means having a mask for generating stepped voltage waveform output upon said laser beam sweeping thereacross;
   comparator means:
   (1) receiving said stepped output to give start-of-scan signal;
   (2) receiving said stepped output to give an intensity correction signal after a first predetermined delay from said start-of-scan signal;
   (3) receiving said stepped output to give a facet-to-axis correction signal after a second predetermined delay from said start-of-scan signal;
   memory means for storing previous amplitude and frequency modulation requirements for each facet of said multiple facet spinner;
   first correction means receiving said previously stored amplitude modulation and incrementally increasing or decreasing amplitude modulation of said acoutooptic modulator depending upon said intensity correction signal;
   second correction means receiving said previously stored frequency modulation and incrementally increasing or decreasing frequency modulation of said acoustooptic modulator depending upon said facet-to-axis correction signal; and
   means for updating said memory means from said first correction means and said second correction means.

2. The dynamic error correction device as recited in claim 1 wherein said mask has a section blocking approximately one-half said laser beam during a portion of said sweeping thereacross for said facet-to-axis correction signal.

3. The dynamic error correction device as recited in claim 1 or 2 wherein said first and second correction means are counters, respectively, whose outputs are converted to analog to operate said acoustooptic modulator and are stored in said memory means.

4. The dynamic error correction device as recited in claim 3 further comprising a mirror identification means actuated by said start-of-scan signal, said mirror identification means indicating to said memory means which facet is reflecting said laser beam.

5. The dynamic error correction device as recited in claim 4 wherein said memory means includes random access memories for said storing previous amplitude and frequency modulation requirements for each facet of said multiple facet spinner, said random access memories being updated each time a respective facet sweeps said laser beam across said photodetector means.

6. A laser scanner comprising:
   a laser for generating a laser beam;
   an acoustooptic modulator for modulating said laser beam;
   a photosensitive drum;
   a multiple facet mirror receiving said laser beam and sweeping said laser beam across said photosensitive drum with each facet upon rotation of said spinner and said drum;
   photodetector means positioned to receive said laser beam immediately prior to said sweeping across said photosensitive drum, said photodetector means having a mask to block part of said laser beam to generate a stepped voltage output upon receiving said laser beam;
   comparator means for generating a start-of-scan signal for each facet upon receiving said stepped output voltage;
   first delay means connected to said comparator means to give an amplitude correction signal after a first predetermined time period from said start-of-scan signal;
   second delay means connected to said comparator means to give a frequency correction signal after a second predetermined time period from said start-of-scan signal;
   memory means for storing previous amplitude and frequency modulation for said acoustooptic modulator for each facet of said mirror;

correction means receiving said amplitude correction signal and said frequency correction signal to adjust said previous amplitude and frequency modulation of said acoustooptic modulator for intensity correction and facet-to-axis correction of said laser beam, respectively, and store said adjusted amplitude and frequency modulation in said memory means, said adjusted amplitude and frequency modulation operating said acoustooptic modulator.

7. The laser scanner of claim 6 wherein said correction means are counters operating near a mid-count thereof to provide amplitude and frequency modulation to said acoustooptic modulator, said counters counting up or down one count for each facet depending upon said amplitude correction signal and said frequency correction signal.

8. The laser scanner of claim 6 wherein said comparator means includes a plurality of comparators receiving said stepped voltage output to generate said start-of-scan signal, said amplitude correction signal and said frequency correction signal for each facet.

9. The laser scanner of claim 6 wherein said memory means are random access memories for said storing, said random access memories being updated for each facet by said amplitude correction signal and said frequency correction signal.

10. The laser scanner of claim 6 further comprising mirror identification means receiving said start-of-scan signal, said mirror identification means identifying to said memory means which facet is reflecting said laser beam.

11. The laser scanner of claim 6 further comprising setup means for storing initial conditions in said memory means upon turning power on for said laser scanner.

12. The laser scanner of claims 6, 7, 8, 9, 10 or 11 wherein said mask includes a section with an edge along a normal line of sweep of said laser beam to block past a part of said laser beam to give said stepped voltage output.

* * * * *

UNITED STATES PATENT AND TRADEMARK OFFICE
CERTIFICATE OF CORRECTION

PATENT NO. : 4,270,131
DATED : May 26, 1981
INVENTOR(S) : E. Neal Tompkins et al.

It is certified that error appears in the above—identified patent and that said Letters Patent is hereby corrected as shown below:

On the title page, add Item [73] Assignee:
-- Datapoint Corporation a Texas Corp. --.

Signed and Sealed this

Twentieth Day of October 1981

[SEAL]

Attest:

GERALD J. MOSSINGHOFF

Attesting Officer    Commissioner of Patents and Trademarks